US011896535B1

(12) United States Patent
Akers, Jr.

(10) Patent No.: US 11,896,535 B1
(45) Date of Patent: Feb. 13, 2024

(54) POWER LIFT

(71) Applicant: Uriah S. Akers, Jr., True, WV (US)

(72) Inventor: Uriah S. Akers, Jr., True, WV (US)

( * ) Notice: Subject to any disclaimer, the term of this patent is extended or adjusted under 35 U.S.C. 154(b) by 937 days.

(21) Appl. No.: 16/392,436

(22) Filed: Apr. 23, 2019

Related U.S. Application Data

(60) Provisional application No. 62/661,621, filed on Apr. 23, 2018.

(51) Int. Cl.
*A61G 3/06* (2006.01)
*A61G 3/02* (2006.01)

(52) U.S. Cl.
CPC ............. *A61G 3/062* (2013.01); *A61G 3/029* (2013.01); *A61G 3/0236* (2013.01); *A61G 3/0245* (2013.01); *A61G 3/0272* (2013.01)

(58) Field of Classification Search
CPC .. A61G 3/0236; A61G 3/0245; A61G 3/0272; A61G 3/029; A61G 3/062
See application file for complete search history.

(56) References Cited

U.S. PATENT DOCUMENTS 5,490,703 A 2/1996 Hewko
6,332,638 B1 * 12/2001 Menna ..................... A61G 1/06 296/26.1
7,540,547 B2 * 6/2009 Lambarth ............ A61G 3/0245 296/19
7,637,550 B2 * 12/2009 Menna ................... A61G 7/012 296/19
7,887,113 B2 2/2011 Lambarth
8,444,195 B2 * 5/2013 Bourgraf .............. A61G 3/0245 296/20
8,864,205 B2 10/2014 Lemire et al.
9,289,336 B2 3/2016 Lambarth
9,456,939 B2 10/2016 Lambarth
9,545,345 B1 * 1/2017 Akers, Jr. .............. A61G 3/029
11,077,000 B2 8/2021 Braun
2008/0240901 A1 10/2008 Lambarth
2009/0015027 A1 1/2009 Lambarth
2011/0080016 A1 4/2011 Lambarth et al.
2012/0237326 A1 * 9/2012 Van Ness ............. A61G 3/0236 414/812

FOREIGN PATENT DOCUMENTS

AU 2008216990 A1 * 4/2009 ........... A61G 1/0212
AU 2005259881 B2 9/2010
AU 2008216990 C1 2/2015
AU 2017100274 A4 4/2017
DE 102010012065 A1 9/2011
DE 102014016905 A1 5/2016
EP 2366369 A2 9/2011
EP 3020381 A1 * 5/2016 ........... A61G 3/0236
(Continued)

*Primary Examiner* — James Keenan
(74) *Attorney, Agent, or Firm* — Johnston Holroyd; Mary-Jacq Holroyd

(57) ABSTRACT

A deployable gurney lift assembly 12 having a carriage assembly 14 composed of a carriage assembly plate 20 with two pivot carriage arms 38 disposed opposite one another to engage the sides of a gurney G, at least one safety bar holder 16 to accommodate a safety bar B of the gurney G, the safety bar holders 16 with at least one bar latch 18 to receive and secure a gurney bar B therein. At least one lift actuator 88 lifts and lowers the arms 38.

24 Claims, 15 Drawing Sheets

(56) References Cited

FOREIGN PATENT DOCUMENTS

| | | | |
|---|---|---|---|
| EP | 3064186 | A1 | 9/2016 |
| EP | 2470140 | B1 | 11/2016 |
| EP | 3020381 | B1 | 5/2018 |
| FR | 3100712 | A1 | 3/2021 |
| WO | 1990004377 | A1 | 5/1990 |
| WO | 2004064698 | A2 | 8/2004 |
| WO | 2016007290 | A1 | 1/2016 |

* cited by examiner

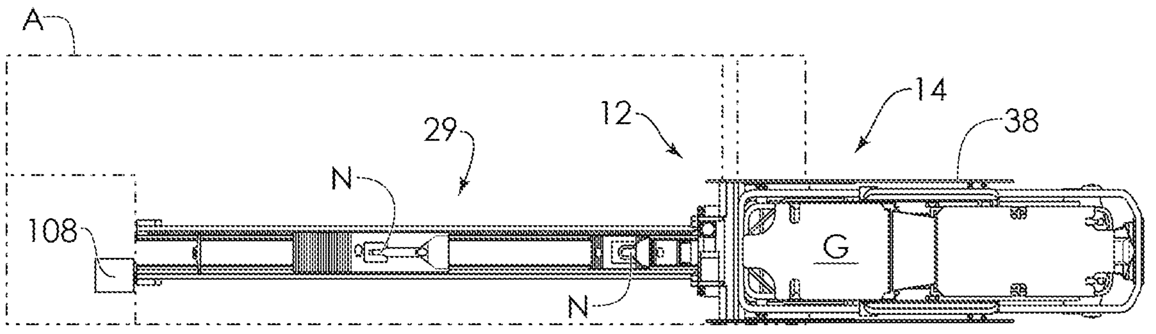
FIG. 5A
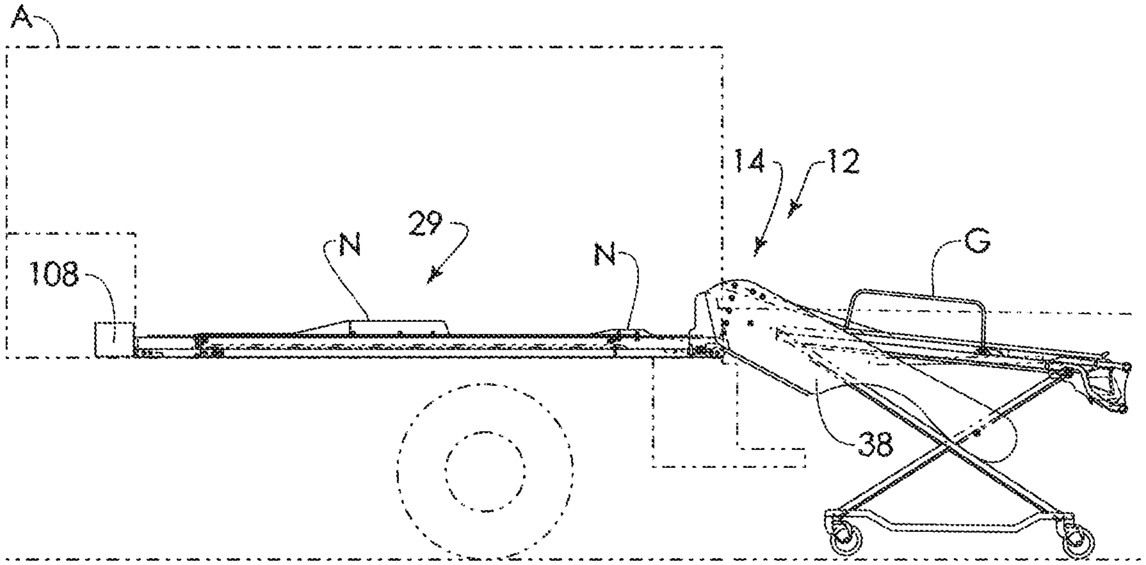
FIG. 5B
FIG. 5C
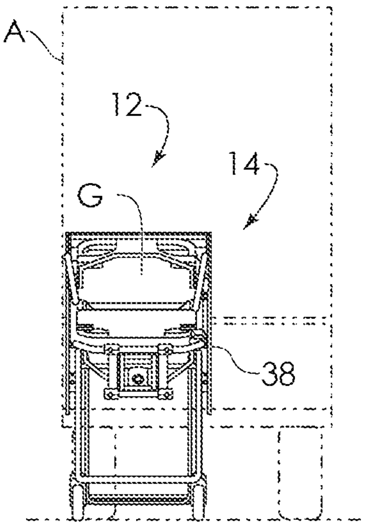

POWER LIFT

RELATED APPLICATIONS

This application claims the benefit of U.S. Provisional Application Ser. No. 62/661,621 entitled "Power Lift" filed on 23 Apr. 2018, the contents of which are incorporated herein by reference in its entirety.

COPYRIGHT NOTICE

A portion of the disclosure of this patent document may contain material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The transportation of patients to and from ambulances is known. Frequently, the transportation of patients from a level curbside or flat ground into, and out of, an emergency vehicle is not possible. Patients are often transported from an emergency or rural location where there are no curbs or even road access. Under both circumstances, patients must be lifted into a transport vehicle typically using a gurney and then loaded into the transport vehicle.

Injuries for emergency personnel transporting patients are common. Back injuries and muscle strains resulting from lifting patients and gurneys are common ailments. Uneven or rough terrains make injuries even more likely. The same is true for helicopter transportation, as well.

There exists a need for patient vehicle loading and unloading in which emergency personnel have a minimum need to physically lift or move the patient into or out of the emergency transport vehicle, such as an ambulance or helicopter.

SUMMARY OF THE INVENTION

The present invention is drawn to a deployable gurney lift assembly 12 having a carriage assembly 14 composed of a carriage assembly plate 20 with two pivot carriage arms 38 disposed opposite one another to engage the sides of a gurney G, and at least one safety bar holder 16 to accommodate a safety bar B of the gurney G. The safety bar holders 16 have at least one bar latch 18 to receive and secure a gurney safety bar B therein. At least one lift actuator 88 lifts and lowers the arms 38, using a pump 91 and hydraulic supply unit 90. At least one retraction guide 50 is on the underside 102 of the carriage assembly plate 20 to engage a rail 28 for slidably moving the carriage assembly 14 along the length thereof to manually or automatically deploy or stow the carriage assembly 14. Optionally, a drive motor 92 may be used to turn a gear 44 engaged in a track 27 to automate the deploying and stowing of the carriage assembly 14 along the rails 27.

A universal floor mount 29, available from Ferno (trademark), may be modified to incorporate two parallel rails 28, and optionally a track 27. The Ferno (trademark) gurneys G have extensions or pins that extend from the bottom of the gurney G undercarriage to mate with two corresponding anchoring notches N provided along the length of the universal floor mounts 29 at two distinct places. These features, pin and notches N, hold the corresponding gurney G in place during transport, and in a vehicular accident, including a rollover accident.

An object of the present design is to secure the gurney G in place within an ambulance A.

A further object of the present design is to provide a power lift 12 that is easy to insert the gurney G on to the carriage lift 14.

Another object of the present design is to be able to provide a power lift 12 as an accessory to universal floor mounts 29.

An object of the present design is to provide a power lift 12 that can be used to automate lifting and stowing a gurney G in an ambulance.

A further object is to provide a power lift 12 with interchangeable and expandable parts such that a basic model may be sold which can be upgraded to a more advanced model with additional functions.

An object of the present design is to provide a power lift 12 with hydraulic supply unit 90 and pump 91 to lower and lift the carriage arms 38 above and below a horizontal plane defined along the length of the rails 28 and track 27 to lift the gurney G above the horizontal plane, and to lower the gurney G below the horizontal plane.

Another object of the present design is to provide a power lift 12 which has a carriage assembly 14 that operates from a charger system 108 instead of being powered directly by the ambulance A battery. The charger system 108 may be recharged by the ambulance A charger system or battery as are conventionally understood in the art. It is also optional to provide a control panel 66 to actuate the carriage arms 38, and to actuate the automatic stowing and deploying of the carriage assembly 14. The onboard gurney G lift (not shown) may further be charged by the charger system 108.

These and other aspects of the present invention will become readily apparent upon further review of the following drawings and specification.

BRIEF DESCRIPTION OF THE DRAWINGS

The novel features of the described embodiments are specifically set forth in the appended claims; however, embodiments relating to the structure and process of making the present invention, may best be understood with reference to the following description and accompanying drawings.

FIGS. 5A-5C show the deployed gurney lift assembly 12 of FIGS. 4A-4C fully deployed state in tilted down position with an upright gurney G locked into position on the lowered retractable carriage arms 14 with the gurney G wheel assembly still down.

Similar reference characters denote corresponding features consistently throughout the attached drawings.

DETAILED DESCRIPTION OF PREFERRED EMBODIMENTS

Figures 1A, 1B, 1C:
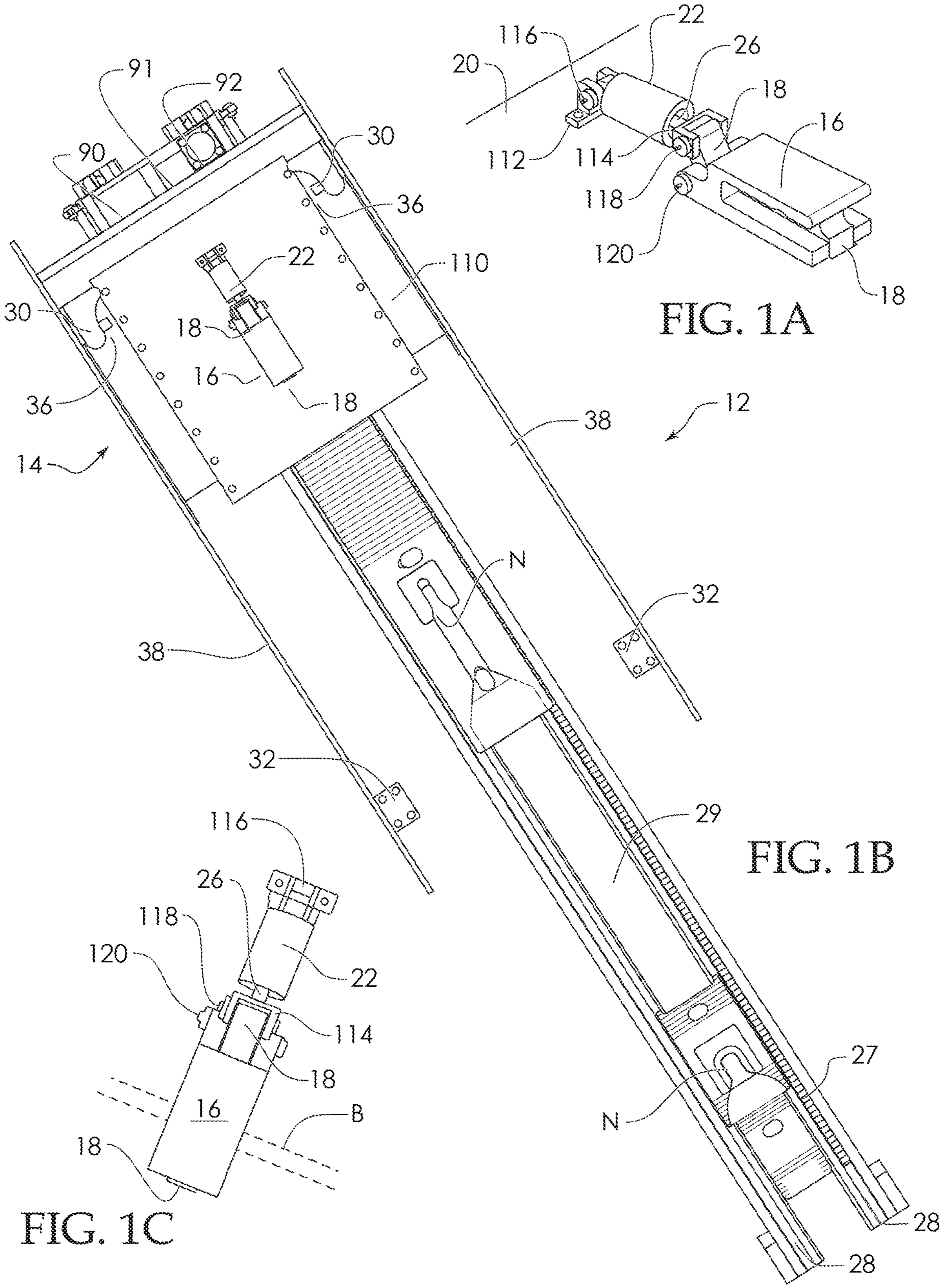
FIGS. 1A-1C show the safety bar holder 16 for a deployable gurney lift assembly 12 according to an alternative embodiment of the present design.

A deployable gurney lift assembly 12 for lifting a gurney G with sides and an undercarriage including wheels, a safety bar B (also known as, an antler bar or bail bar), and an apparatus for raising and lowering the gurney G. The deployable gurney lift assembly 12 is installed in an ambulance A to be deployable on at least one deployment rail 28. The contents of PCT Application No. PCT/US2018/044894 entitled "Power Lift" filed on 1 Aug. 2018 are incorporated herein by reference in its entirety; which PCT Application claims the benefit of U.S. Provisional Application Ser. No. 62/539,545 entitled "Power Lift" filed on 1 Aug. 2017, which is also incorporated herein by reference in its entirety. FIGS. 1A-1C show a carriage assembly 14 and a safety bar holder 16 for a deployable gurney lift assembly 12 according to alternative embodiments of the present design. In an environmental view, the safety bar holder 16 can be seen in FIG. 1A. The carriage assembly 14 has two parallel opposing carriage arms 38 that engage the sides of the undercarriage of the gurney G, which can be seen in FIG. 1B, while the safety bar holder 16 is shown with the safety bar B, represented in dashed lines, in the safety bar holder 16, as shown in FIG. 1C.

Each carriage arm 38 has an idler frame bracket 30, a rotating pickup 32 to engage the undercarriage of the gurney G, and a locking bracket pin 36 to secure the gurney G in place on the carriage arm 38, in which the locking bracket pin 36 is disposed under the idler frame bracket 30 to further restrict movement of the gurney G engaged on the carriage assembly 14. A hydraulic jack 22 may be affixed to the carriage assembly plate 20, in which the hydraulic jack 22 has an actuation arm 26 affixed to the safety bar holder 16 and the safety bar latch 18 to bias the safety bar latch 18 from an open position to a closed position.

The deployable gurney assembly 12 has a carriage assembly 14 that may be used with an existing universal floor mount 29 available from Ferno (trademark) (of Wilmington, Ohio), or a modified universal floor mount 29, provided that the parallel rails 28 are sufficiently robust to support the carriage assembly 14. These Ferno (trademark) universal floor mounts 29 have two (2) notches N that mate with two (2) pins (not shown) extending from underneath the gurneys G corresponding to the notches N when stowed on the universal floor mounts 29.

Alternative, universal floor mounts 29 may be available from other vendors as well. Such universal floor mounts 29 are used to secure gurneys G to the bed of an ambulance A at two (2) anchoring points to prevent the gurney G (and patient) from becoming dislodged. A modified universal mount 29 may be used which has parallel rails 28 for the deployable gurney carriage assembly 14 to ride along. An optional track 27 running along the length of the rails 28 may be provided so that the carriage assembly 14 may be advanced on the rails 28 using a motor 92 to deploy and stow the carriage assembly 14. In the alternative, parallel rails 28 may be used with or without a standalone track 27.

Figure 2A:
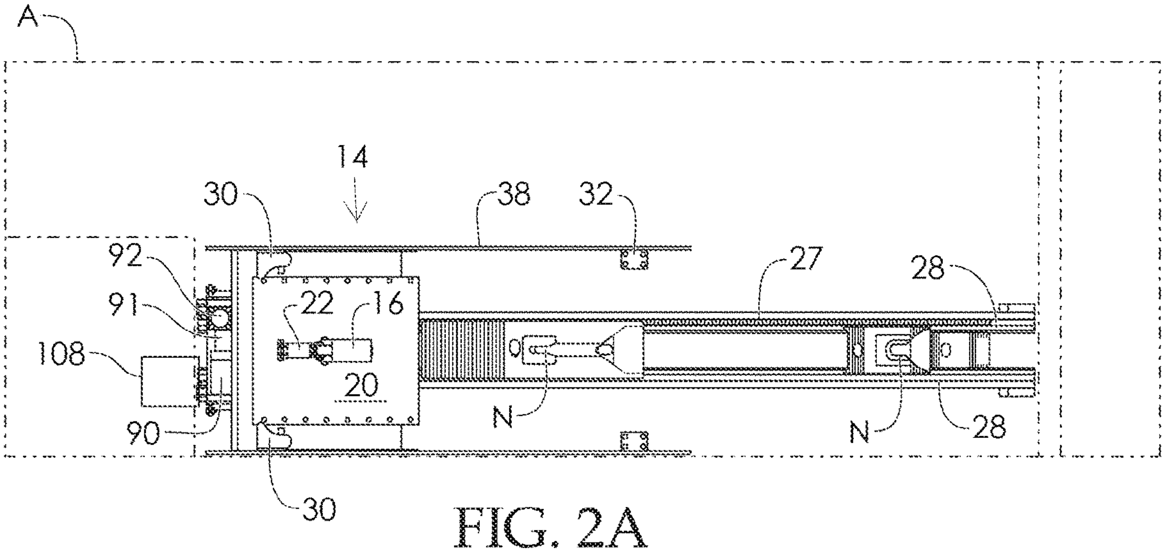
FIGS. 2A-2C shows a deployable gurney lift assembly 12 according to the embodiment of FIGS. 1A-1C with the assembly 12 fully withdrawn into an ambulance A depicted in dashed lines.
Figure 2B:
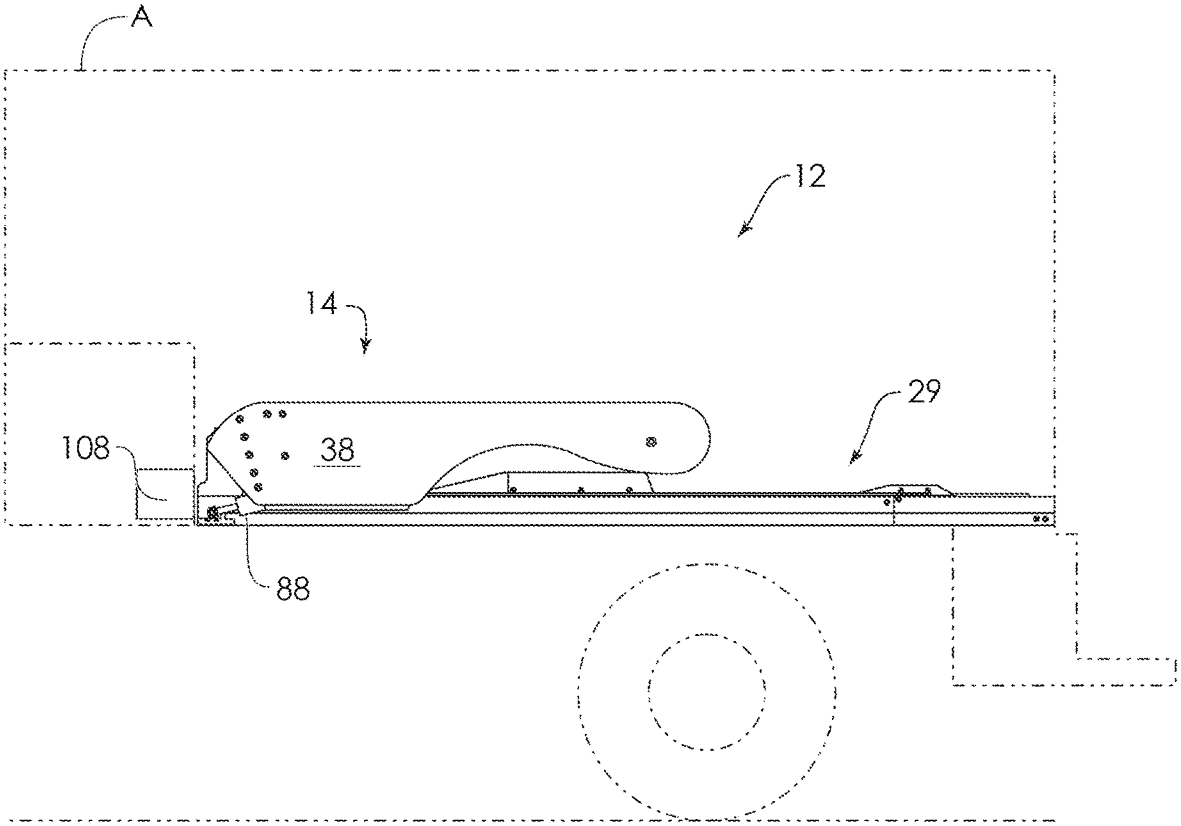
Figure 2C:
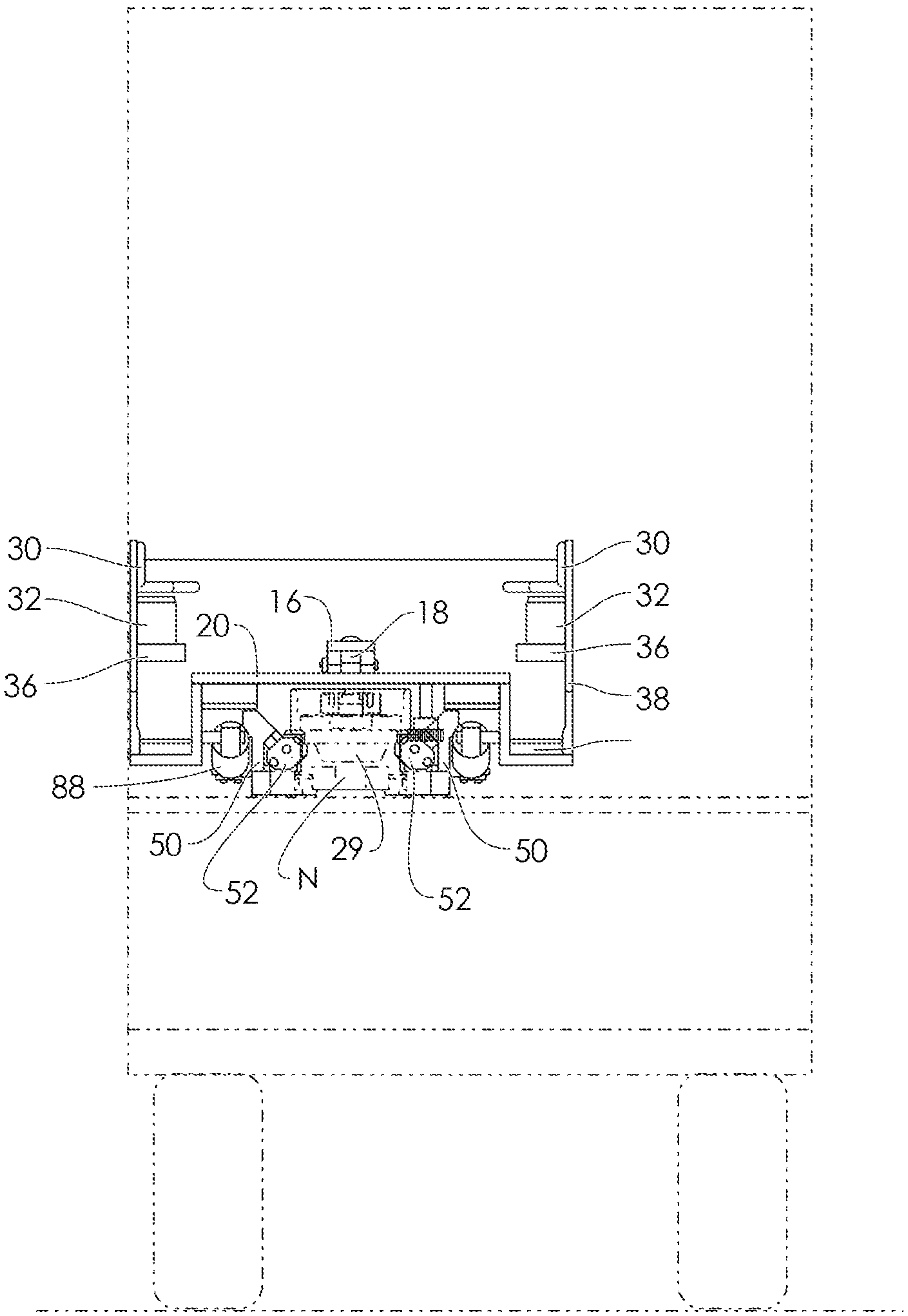

FIGS. 2A-2C shows a deployable gurney lift assembly 12 according to the embodiment of FIGS. 1A-1C with the carriage assembly 14 fully withdrawn into an ambulance A depicted in dashed lines. FIG. 2A shows the stowed carriage assembly 14 completely within the ambulance A all the way to the front of the ambulance A where the recharger assembly 108 is directly adjacent the carriage assembly 14. FIG. 2B shows a side view with the recharger assembly adjacent the motor box 108 for automatically recharging any features of the deployable gurney lift assembly 12 and of the gurney G, if so configured.

Figure 3A:
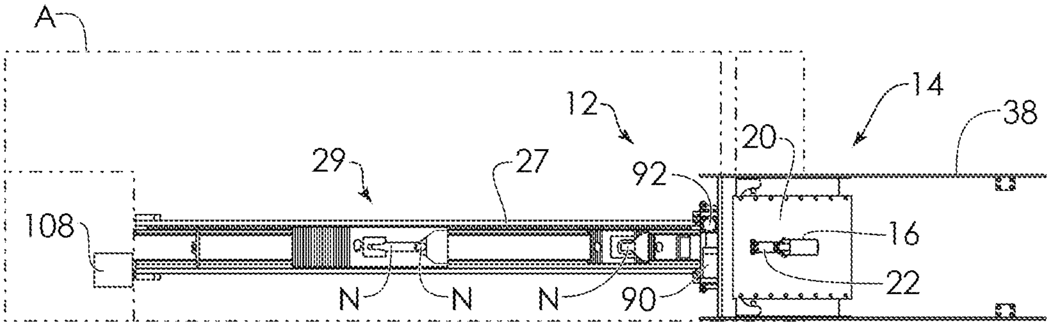
FIGS. 3A-3C show a deployable gurney lift assembly 12 according to the embodiment of FIGS. 1A-1C with the carriage assembly 14 fully deployed from the ambulance A with the carriage arms 38 in the up position.
Figure 3B:
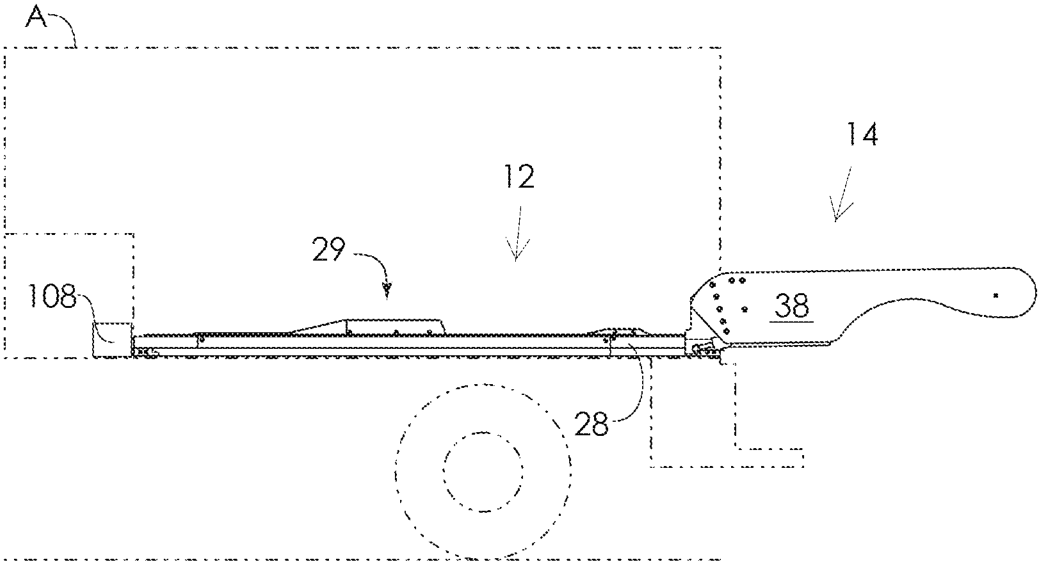
Figure 3C:
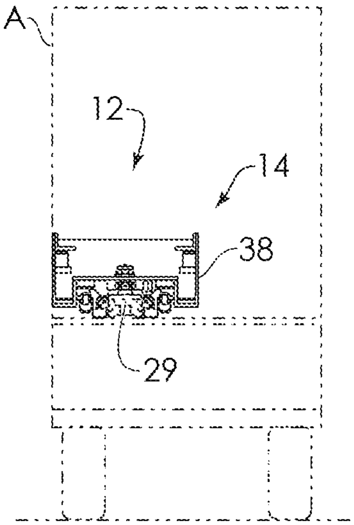

FIGS. 3A-3C show a deployable gurney lift assembly 12 according to the embodiment of FIGS. 1A-1C with the carriage assembly 14 fully deployed from the ambulance A with the carriage arms 38 in the up position. FIG. 3A shows an elevated view of the deployable gurney lift assembly 12 showing the position of the features in the fully deployed, and up position. FIG. 3B shows the lift at one degree above the horizontal plane, which ensures that the gurney G wheels are off of the floor when stowing the gurney G. It is in this position that the gurney G can be secured to the third-party universal floor mount 29. The gurney G must be lifted over the notches. FIG. 3C shows the fully deployed but up position from behind the rear of the vehicle.

Figure 4A:
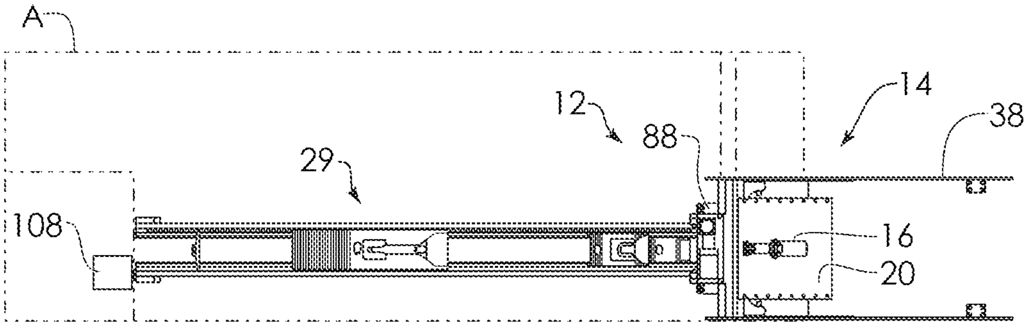
FIGS. 4A-4C show a deployable gurney lift assembly 12 according to the embodiment of FIG. 1A-1C with the carriage assembly 14 fully deployed from the ambulance A with the retractable carriage assembly 14 in the maximum extension from the rails 28 and the carriage arms 38 tilted down ready to accept a gurney G.
Figure 4B:
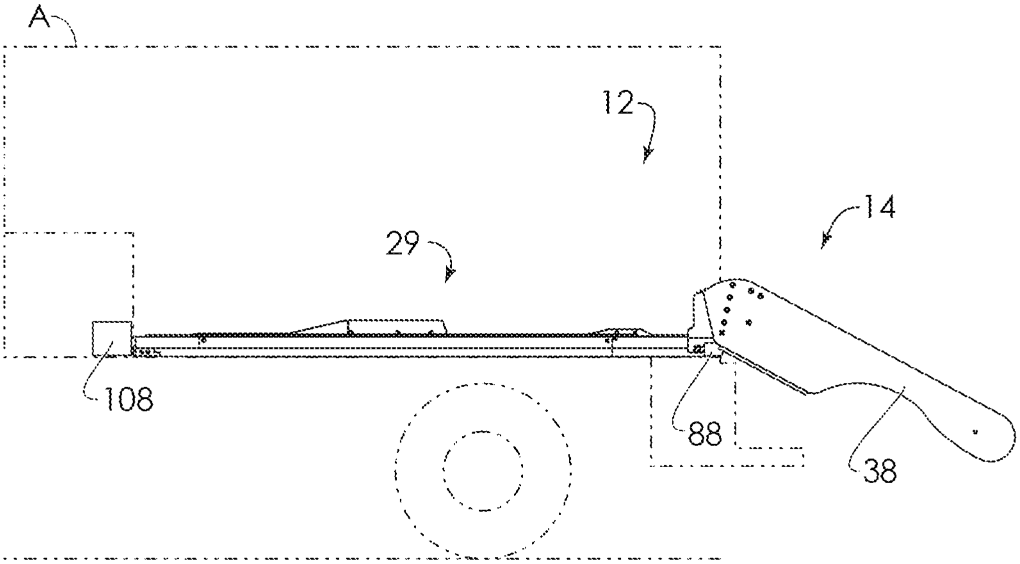
Figure 4C:
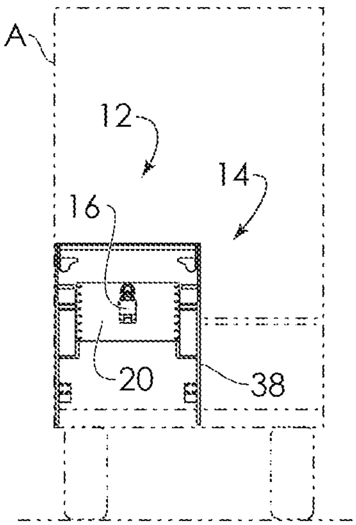

FIGS. 4A-4C show a deployable gurney lift assembly 12 according to the embodiment of FIG. 1A-1C with the carriage assembly 14 fully deployed from the ambulance with the maximum extension from the rails 28, and the carriage arms 38 tilted down ready to accept a gurney. FIG. 4A is a top view showing the carriage assembly 14 and carriage arms 38 tilted downward. FIG. 4B shows the fully deployed and fully tilted to approximately twenty-eight (28°) degree position. FIG. 4C shows the carriage arms 38 in the fully deployed and downward position ready for a gurney G to be engaged therein.

FIGS. 5A-5C show the deployed gurney lift assembly 12 of FIGS. 4A-4C. The carriage arms 38 and the carriage assembly 14 are shown fully deployed in a tilted down position with an upright gurney G locked into position on the lowered carriage assembly 14, as shown in FIG. 5A from above. The gurney G wheel assembly still down, as shown in FIGS. 5B and 5C, from the side and from the back of the ambulance A.

Figure 6A:
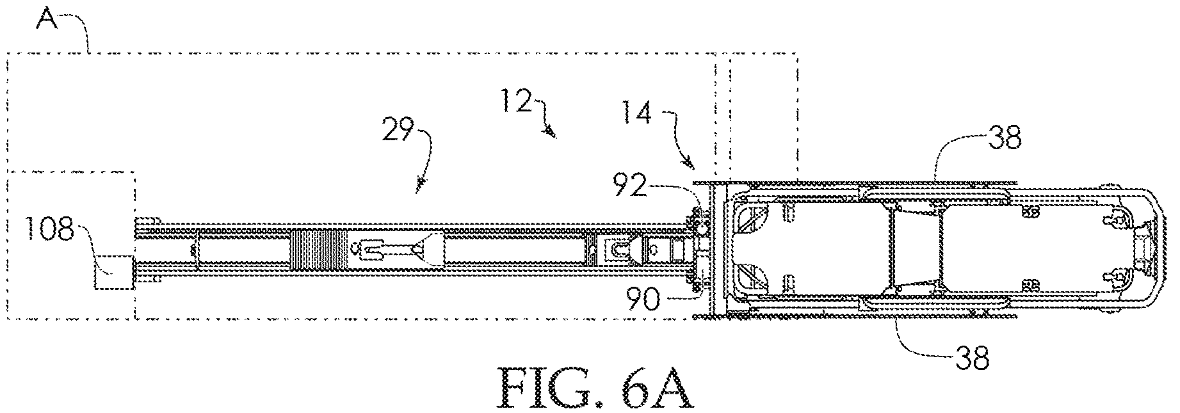
FIG. 6A-6C show a deployed gurney lift assembly 12 with gurney G locked in and tilted up to horizontal position with gurney G wheels shown still extended to down position (in phantom lines) and in the up position (in solid lines).
Figure 6B:
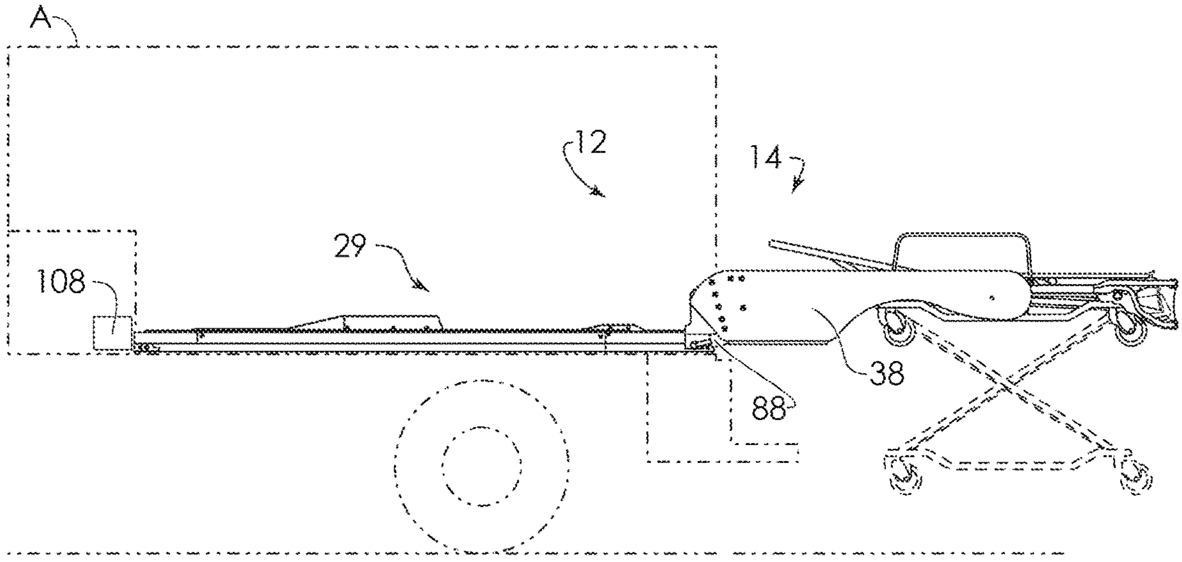
Figure 6C:
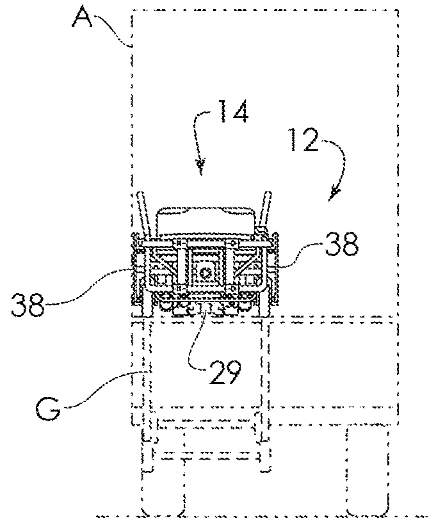

FIG. 6A-6C show a deployed gurney lift assembly 12 with gurney G locked in and tilted up to horizontal position with gurney wheels shown still extended to down position (in phantom lines) and in the up position (in solid lines). FIG. 6A shows the gurney G and the carriage assembly 14 from above. FIGS. 6B and 6C show the gurney G in an up position with the gurney's G legs from the side and back respectively.

FIGS. 7A-7E show the deployable gurney lift assembly 12 and gurney G in various carriage assembly 14 positions ranging from initial out and down in position to receive the gurney G through intermittently positions till the deployable gurney lift assembly 12 and gurney G are retracted fully and stowed in the ambulance A. The carriage arms 38 can move from twenty eight degrees downward from the horizontal to receive a gurney G and to lift the carriage arms 38 with the gurney G to one degree above the horizontal to position the gurney G to clear the first notch N and then returned to the horizontal position to engage the gurney G in both of the notches N of the universal floor mount 29. Fully stowed, the carriage arms 38 remain in a horizontal position.

Figure 7A:
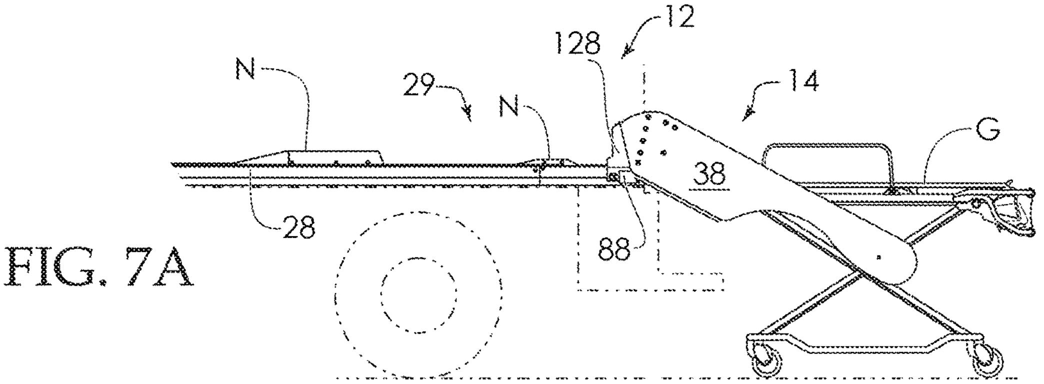
FIGS. 7A-7E show the deployable gurney lift assembly 12 with the carriage arms 38 gurney G in positions ranging from initial out and down in position to receive the gurney through intermittently positions till the carriage assembly 14 and gurney G are retracted fully into the ambulance A.
Figure 7B:
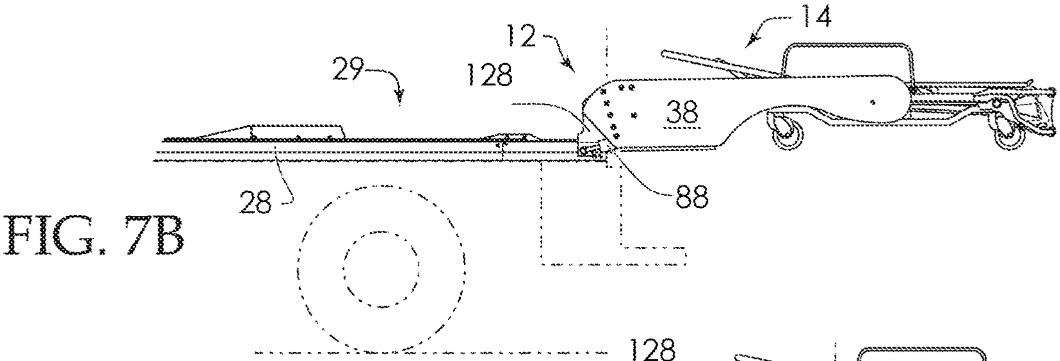
Figure 7C:
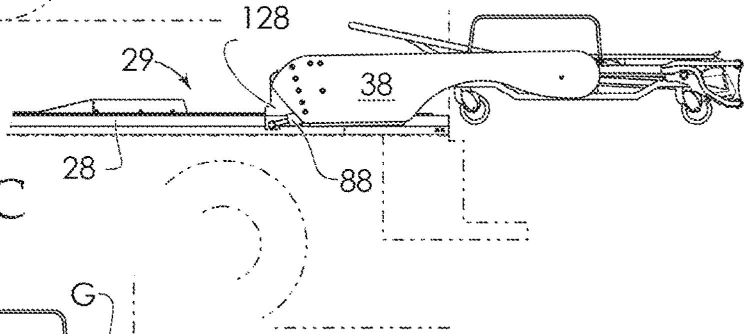
Figure 7D:
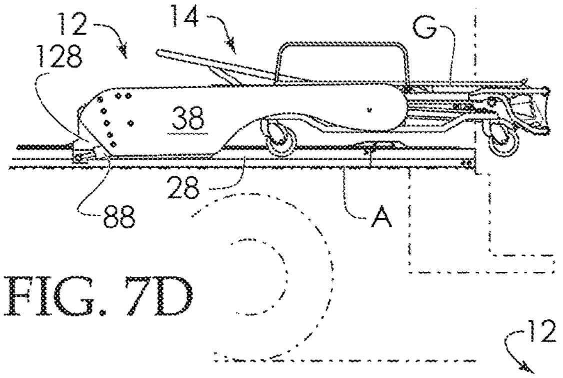
Figure 7E:
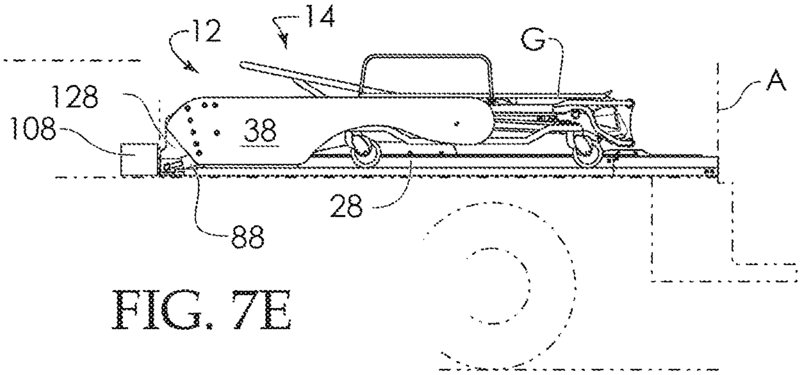

FIG. 7A shows the carriage assembly 14 fully deployed with the carriage arms 38 down, twenty-eight degrees down, with the gurney G inserted into position for the lift and stowing. FIG. 7B shows the carriage assembly 14 in fully deployed position with the carriage arms 38 with the gurney G lifted one degree up with the gurney G undercarriage in the up position. FIGS. 7C and 7D show the carriage assembly 14 partially retracted with the carriage arms 38 and the gurney G tilted up one degree to align the gurney's G pins with the universal mount's 29 notches. FIG. 7E shows the carriage assembly 14 and gurney G in the fully stowed and horizontal position. The gurney G affixed at two points to the universal mount 29.

Figure 8A:
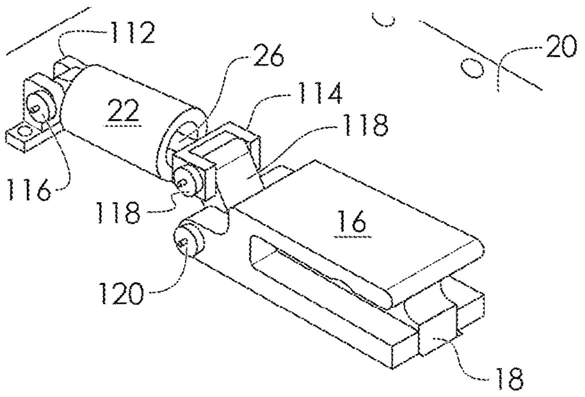
FIGS. 8A-8C show the safety bar holder 16 and accompanying features that holds the gurney G safety bar B, which is also called a safety bar B, being inserted in the safety bar holder 16 with the latch 18 in a closed position.
Figure 8B:
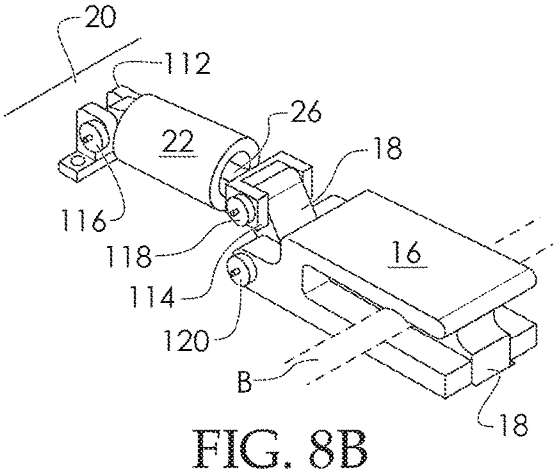
Figure 8C:
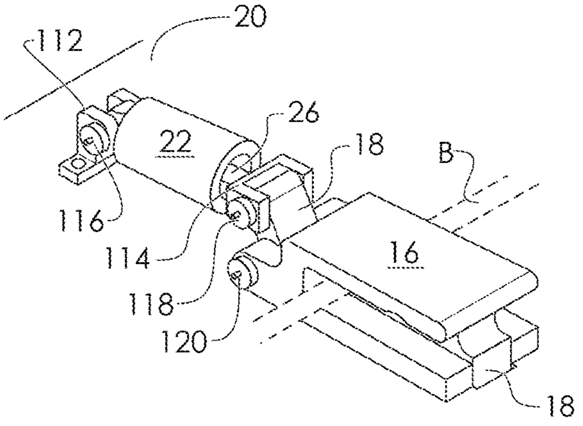

FIGS. 8A-8C show the safety bar holder 16 that holds the gurney G bar B, which is also called a safety bar B, in the closed position. FIG. 8A shows the safety bar holder 16 without a bar B present but in the closed position. FIG. 8B shows the safety bar holder 16 with the gurney safety bar B being inserted but without the gurney G being all the way secure. FIG. 8C shows the safety bar holder 16 in a closed position with the gurney bell bar B pushed all the way to the back of the safety bar holder 16 which is all the way back so that the gurney G would be locked in place on the carriage arms 38.

The safety bar holder 16 and the latch 18 may be pivotably connected by a pivot point pin 120 which permits the latch 18, or both safety bar holder 16 and latch 18, to be biased together to secure a gurney G therebetween. The safety bar holder 16 and latch 18 are actuated by a hydraulic jack 22 which has a piston 26 retractably extending from the hydraulic jack 22 in which the piston 26 is clevis mounted 114 to the latch 18 with a quick release pin 118, as shown in FIGS. 8A-8C. The hydraulic jack 22 is pivotably attached by a pivot pin 116 to the safety bar jack bracket 112 affixed to the carriage assembly plate 20, and the latch 18 may extend through the carriage assembly plate 20 beneath the safety bar holder 16 when the latch 18 is in an open or unsecured position.

Figure 9:
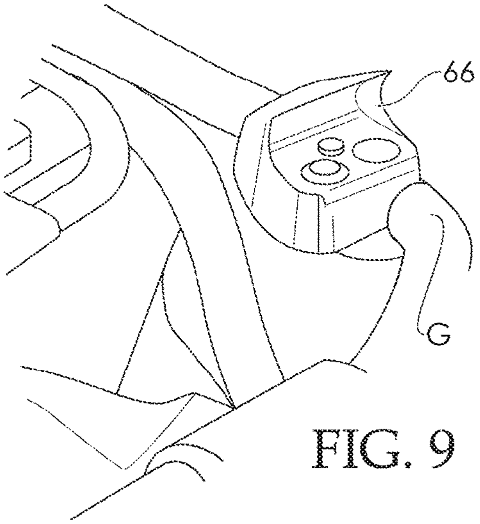
FIG. 9 shows an embodiment of a controller interface 66 for actuating the onboard gurney G lift (not shown) which may be disposed on the gurney G, and furthermore, may be programmable to server as the actuator for the movement of the carriage assembly 14, carriage arms 38, and optional light system 68, 69, 70, and 71.

FIG. 9 shows an embodiment of a wireless controller interface 66 for actuating the gurney lift which may be disposed on the gurney G. It is also optional to provide a control panel 66 to actuate the carriage arms 38, and to actuate the automatic stowing and deploying of the carriage assembly 14. Some gurneys G have their own control panels 66 which may be adapted to accommodate the actuation of the several automated functions of the carriage assembly 14. These automated functions include light functions, tilt position of the carriage arms 38, position of the carriage assembly 16 along the track 27 adjacent the rails 28.

The power lift 12, which has a carriage assembly 14 that, operates either directly from the ambulance A electrical system, or indirectly through a separate charger system 108 that is recharged using the ambulance A electrical system. The charger system 108 may be recharged by the ambulance A charger system (or battery) as are conventionally understood in the art. The onboard gurney G lift (not shown) may further be charged by the charger system 108.

Figure 10A:
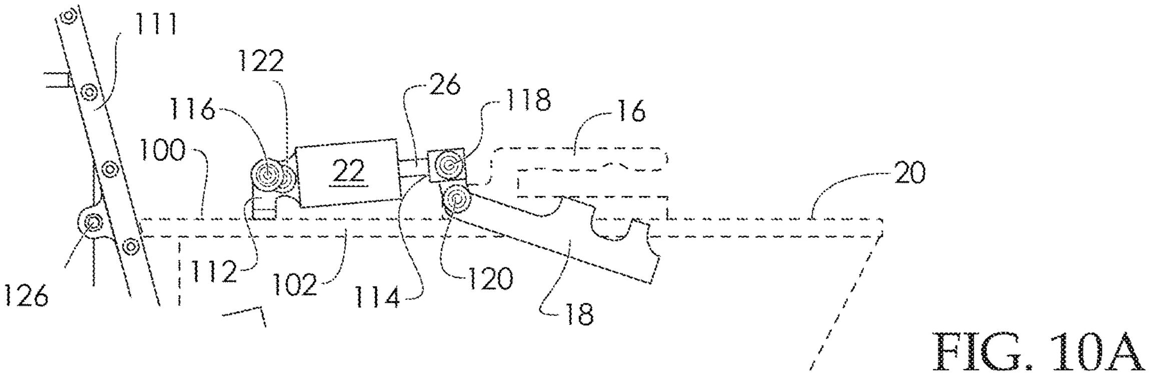
FIGS. 10A-10C show side, and elevated environmental, views demonstrating the safety bar holder 16 with FIG. 10A showing the latch 18 in an open position, and FIGS. 10B and 10C with the safety bar B engaged in the bar holder 16 with the latch 18 closed.
Figure 10B:
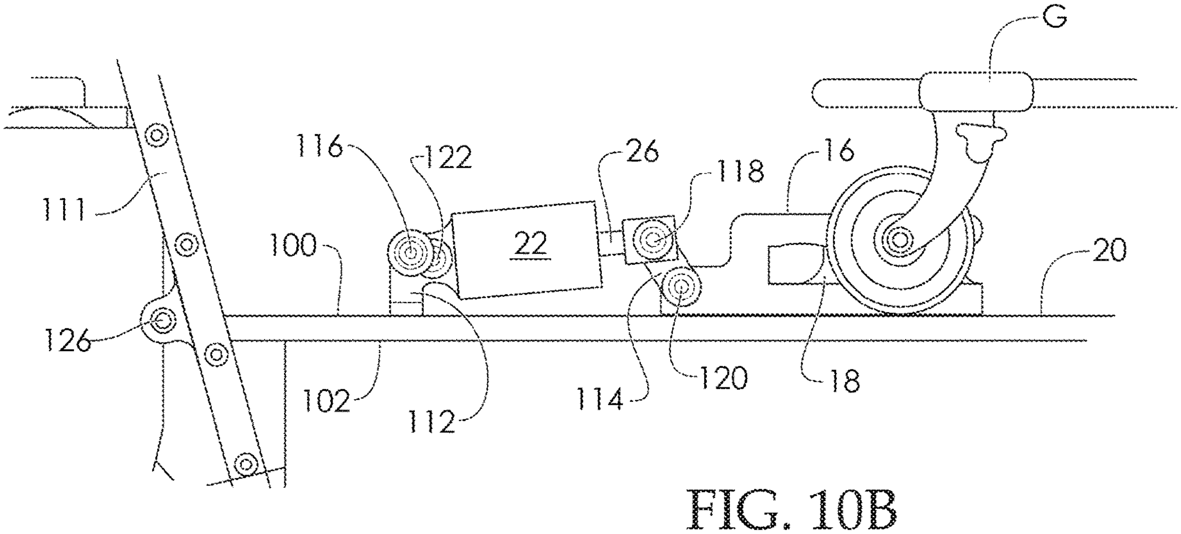
Figure 10C:
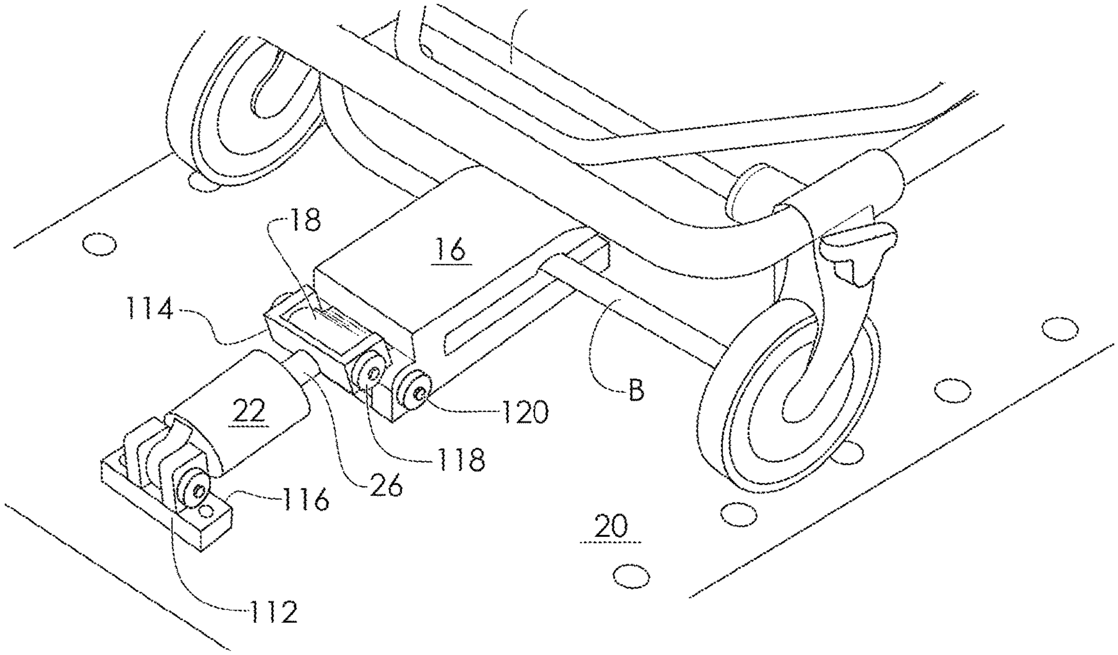

FIGS. 10A-10C show side, and elevated environmental, views of safety bar holder 16 and latch 18 according to the present invention. FIG. 10A shows a side view of the safety bar holder 16 with the safety bar latch 18 in an open position. FIG. 10B shows the safety bar holder 16 from the side showing all the working movements of the holder 16 and latch 18. FIG. 10B also shows the carriage hinge plate 111 and the carriage hinge plate pivot point 126. FIG. 10C shows a cutaway environmental perspective view of the safety bar holder 16 closed on a gurney G safety bar B.

FIGS. 11A-11F shows an arrangement of various optional light indicators that may be incorporated into the carriage arm 38. At least one light 68, 69, 70, and 71 may be disposed on at least one of the carriage arms 38. Which lighting may include at least one deployment indicator light 68 to indicate a deployment status of the carriage assembly 14 in which the deployment statuses include stowing, deploying, and stopped statuses. At least one ground illumination light 69 may be provided to illuminate downward from the carriage arms 38. At least one gurney lock or unlocked indicator light 70 to indicate whether the carriage assembly 16 is locked in position or free to move along the rails 28. At least one work station light 71 may be provided to illuminate the carriage assembly 14 when unlocked. Combinations of different lighting may be used, and the lighting is not limited to that shown.

Figure 12:
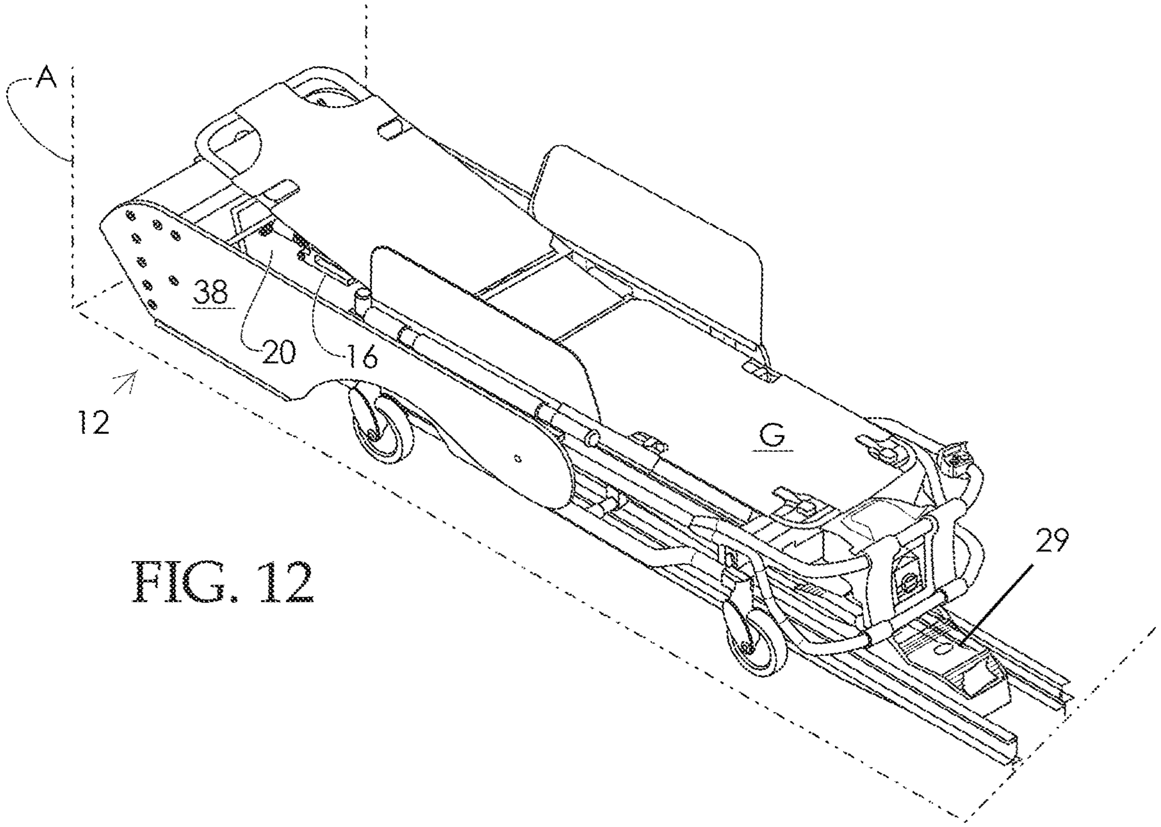
FIG. 12 is an elevated perspective side view of a deployable gurney lift assembly 12 with a gurney G engaged thereon in the carriage assembly 14 showing the mechanism to retain the undercarriage of the gurney G.
Figure 13:
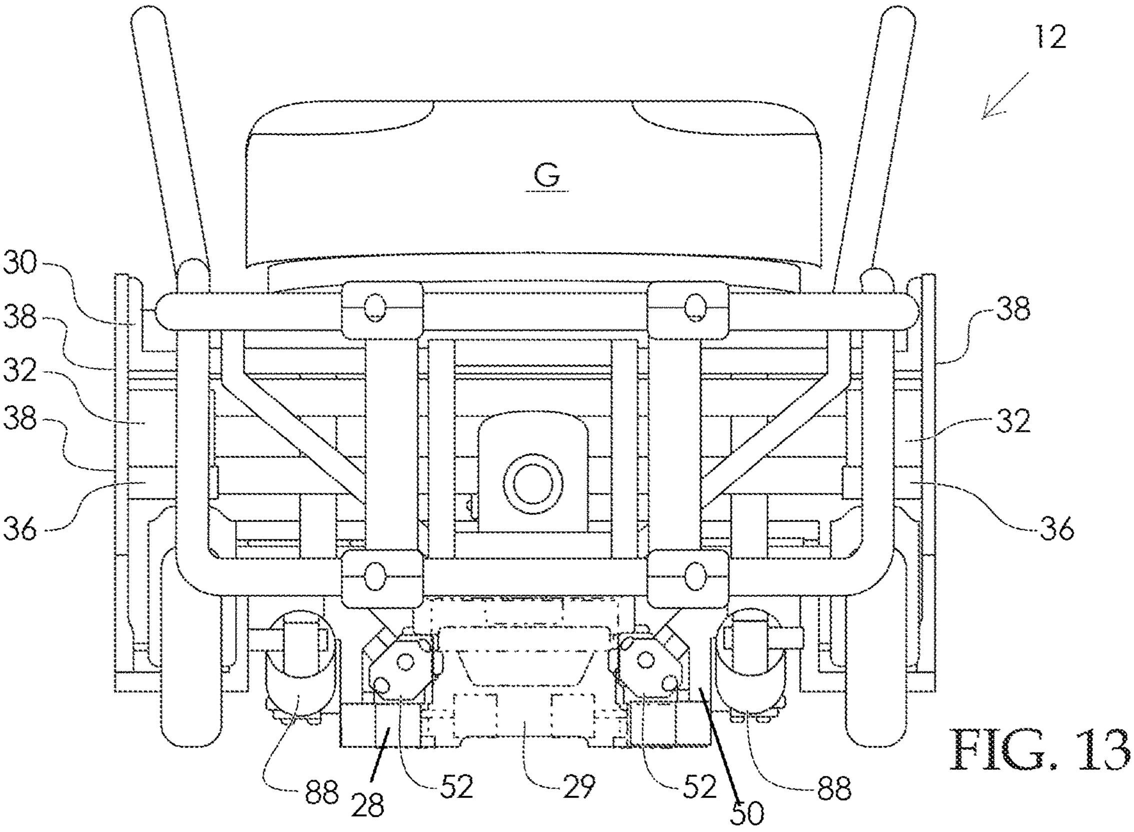
FIG. 13 shows a rear view of a deployable gurney lift assembly 12 with the gurney G engaged thereon showing the mechanism of the gurney lift assembly 12 as it engages with a gurney G in the stowed position.

FIG. 12 is an elevated perspective side view of a deployable gurney lift assembly 12 with a gurney G engaged thereon. The position of the stowed gurney G relative to the universal mount 29. FIG. 13 shows a rear view of a gurney lift assembly 12 with the gurney G engaged thereon showing the position of the stowed gurney G, the carriage arms 38, and the universal mount 29 include the rails 28. The position of the bearings 52 and bearing bracket 50 relative to the rails 28 are shown as well.

Figure 11A:
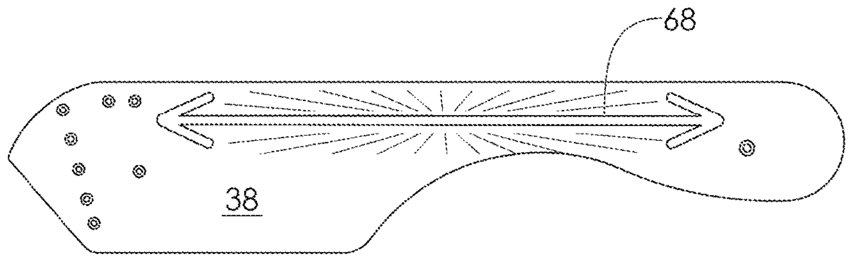
FIGS. 11A-11F shows greater carriage arm 38 detail from alternate side views, and further, shows various optional light indicators 68, 69, 70, and 71 that may be incorporated into the carriage arm 38, and the positions of the various parts of the carriage assembly 14 relative thereto.
Figure 11B:
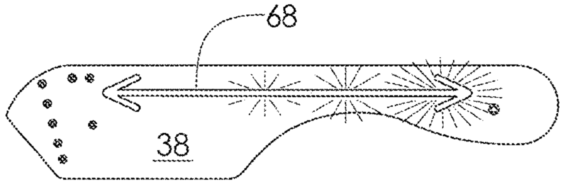
Figure 11C:
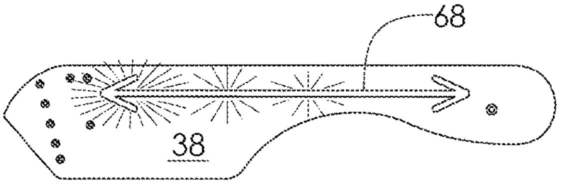
Figure 11D:
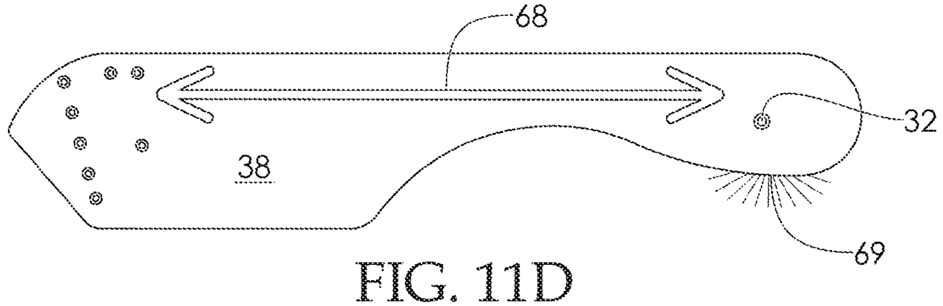
Figure 11E:
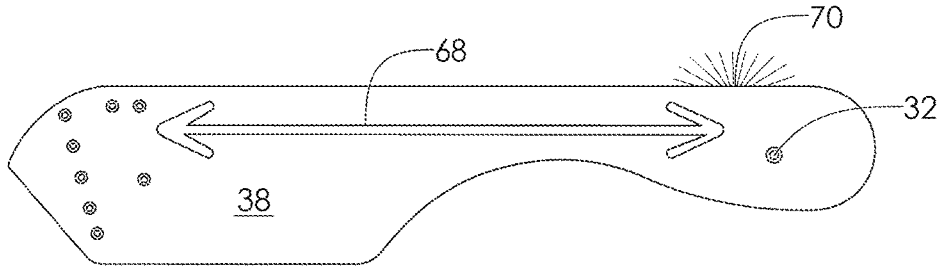
Figure 11F:
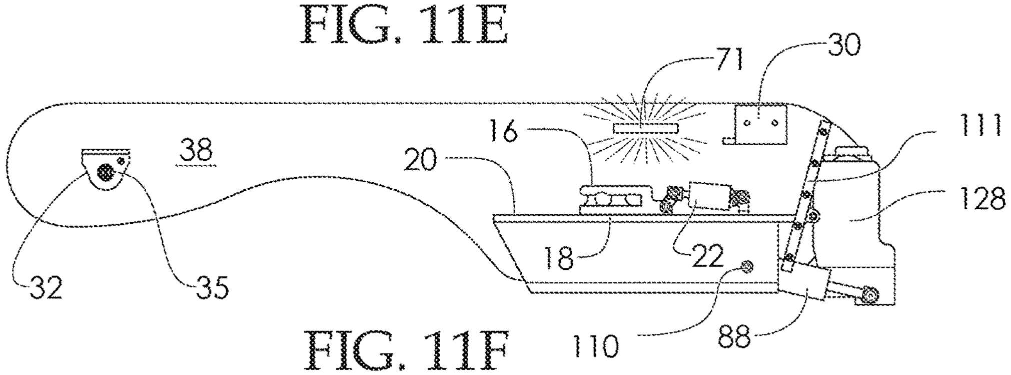

In an embodiment of the present design, the deployable gurney lift assembly 12 may utilize a single hydraulic jack 88 or two hydraulic jacks 88 to lift the carriage arms 38. The hydraulic jack(s) 88 may be located in the middle section of the floor of the motor box 128, above the motor box cover 124, or on either side of the bearing bracket 50. FIG. 11F shows the arrangement of the cylinder 88 from one side wherein the cylinder is attached to the wall of the motor box 128 and to the carriage angle 110 from the side.

Figure 14A:
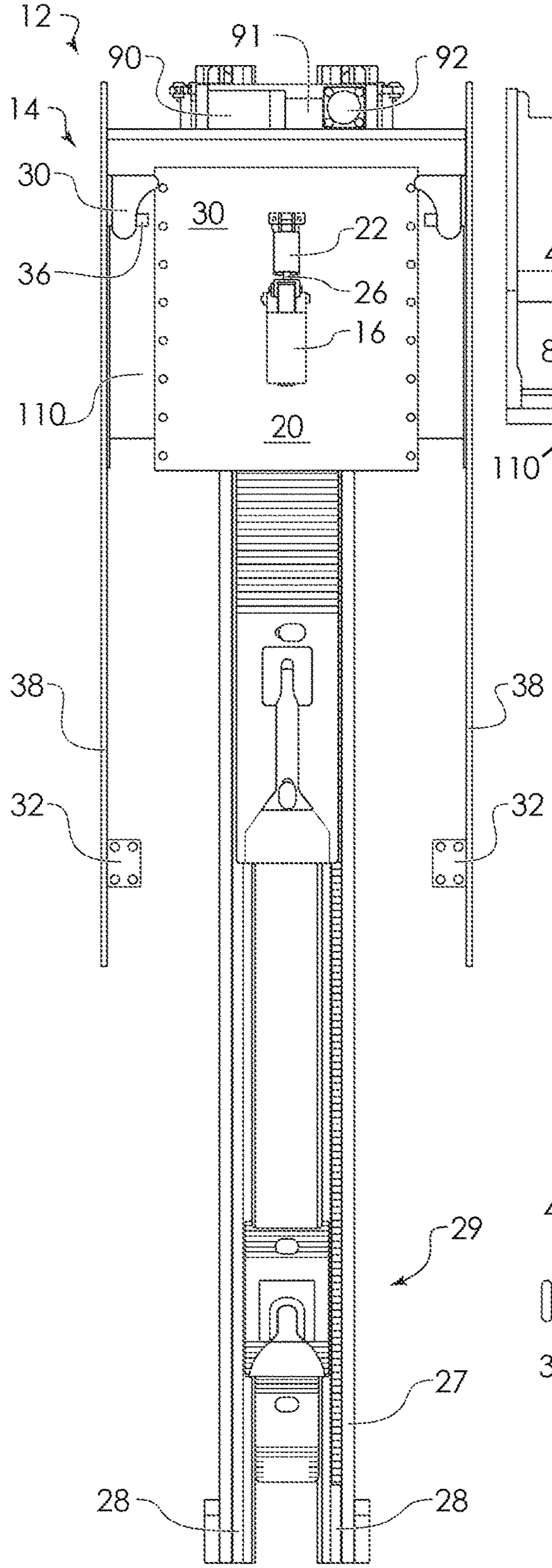
FIGS. 14A and 14B show the deployable gurney lift assembly 12 with the carriage assembly 14 in stowed position which includes an motor 92 and rotating gear shaft 93 and toothy gear 44 which rotates to advance the carriage assemble along the track 27 disposed directly adjacent or above one of the rails 28.
Figure 14B:
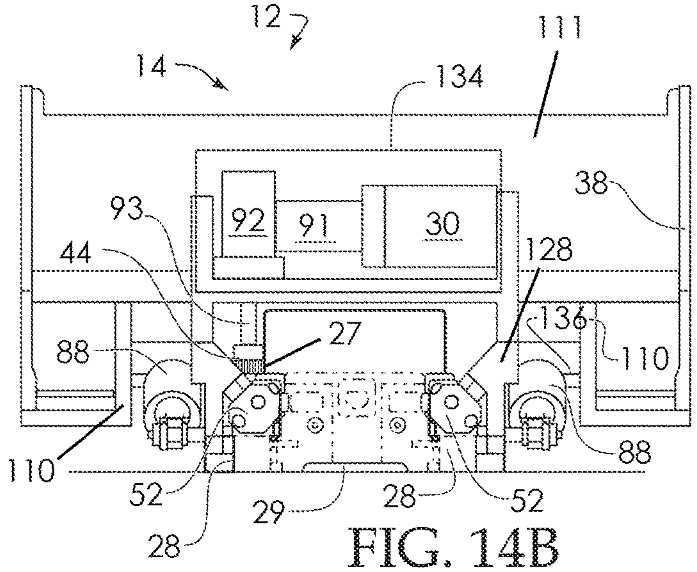

FIGS. 14A and 14B show the deployable gurney lift assembly 12 in stowed position. FIG. 14A shows the deployable gurney lift assembly 12 from above including the rails 28 and the track 27. FIG. 14B is a view from the front looking back, and shows the motor 92 and rotating gear shaft 93 which has a toothed gear 44, which rotates to advance or retract the carriage assembly 14 along the track 27. In an embodiment of the present invention, a pair of carriage angles 110, shown from above in FIG. 14A and from the front in FIG. 14B, are disposed between the carriage arms 38 and the carriage assembly plates 20 to attach each carriage arm 38 to the adjacent edge of the carriage hinge plate 111 of the carriage assembly plate 20. In this embodiment, each one of the two hydraulic jacks 88 is affixed to one of the carriage angles 110 at the swivel pin 136, and to the motor box 128 to control the angle of the carriage arms 38, and to lift a gurney G engaged in the holder 16 and latch 18. In an alternative embodiment, the at least one hydraulic jack(s) 88 affixed to the center of the motor box base plate 128, and to the carriage hinge plate 111, to lift and lower the carriage assembly plate 20 with the carriage arms 38 attached thereto.

Figure 15A:
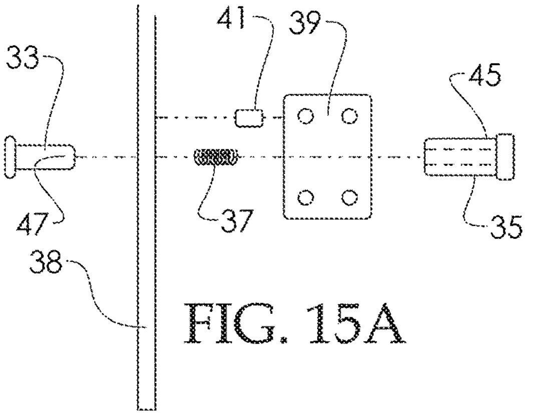
FIGS. 15A and 15B show the components of the rotatable quick release pickup bracket 32 from above the carriage arm 38 and from the back or front along the carriage arm 38 respectively.
Figure 15B:
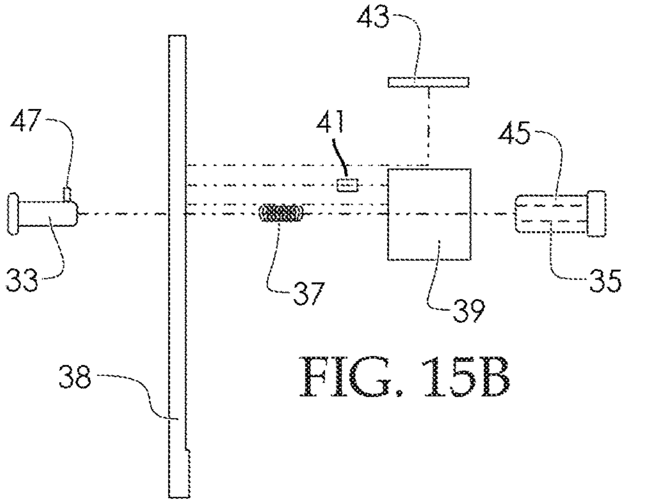

FIGS. 15A and 15B show the quick release pickup assembly 32 showing the arrangement of features including the carriage pickup pin shaft 35, the mating pickup shaft 33 with internal key 45 to fit into keyway 47 of carriage pick up shaft 33. A spring 37 is disposed therebetween, as shown in FIG. 15B to keep tension between the two shafts 33 and 35. Pin 41 provides secure attachment between pick up body 39 of pickup assembly 32. A rubber pad 43 may be provided on top of the pickup assembly 32 to protect the gurney G from scratches and scrapes.

Figure 16A:
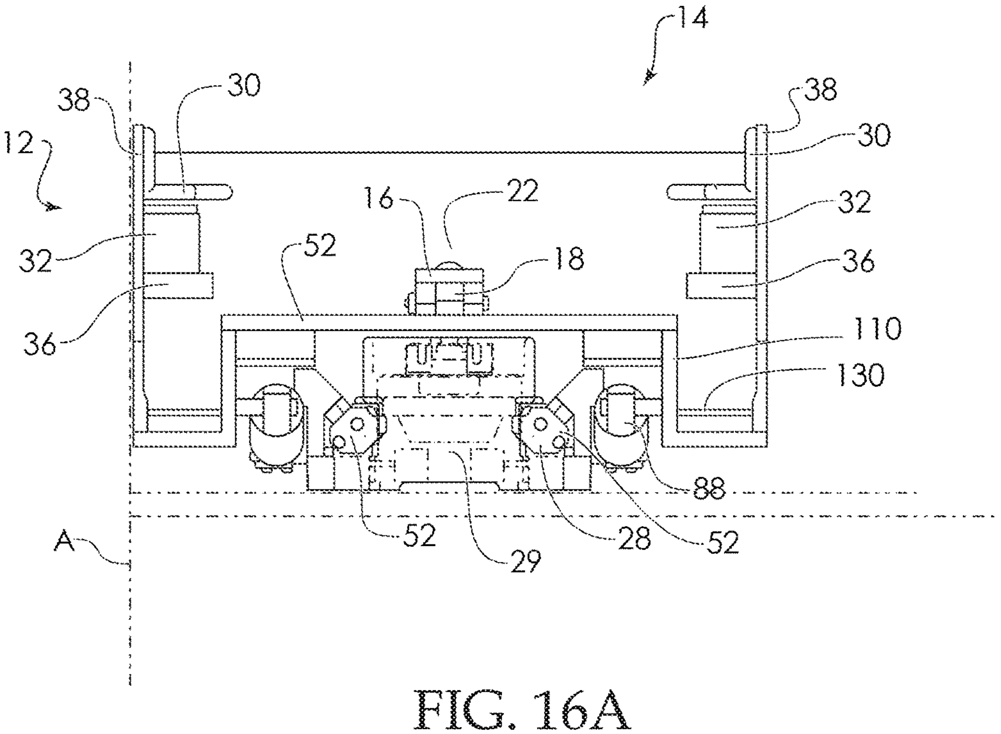
FIGS. 16A-16C show the placement of parts for an alternative deployable gurney lift assembly 12 in which the carriage assembly 14 is manually advanced back and forth along the rails 28 by pulling/pushing the carriage assembly 14 or a gurney G fully engaged on the carriage assembly 14 in the safety bar holder 16 with the latch 18 closed.
Figure 16B:
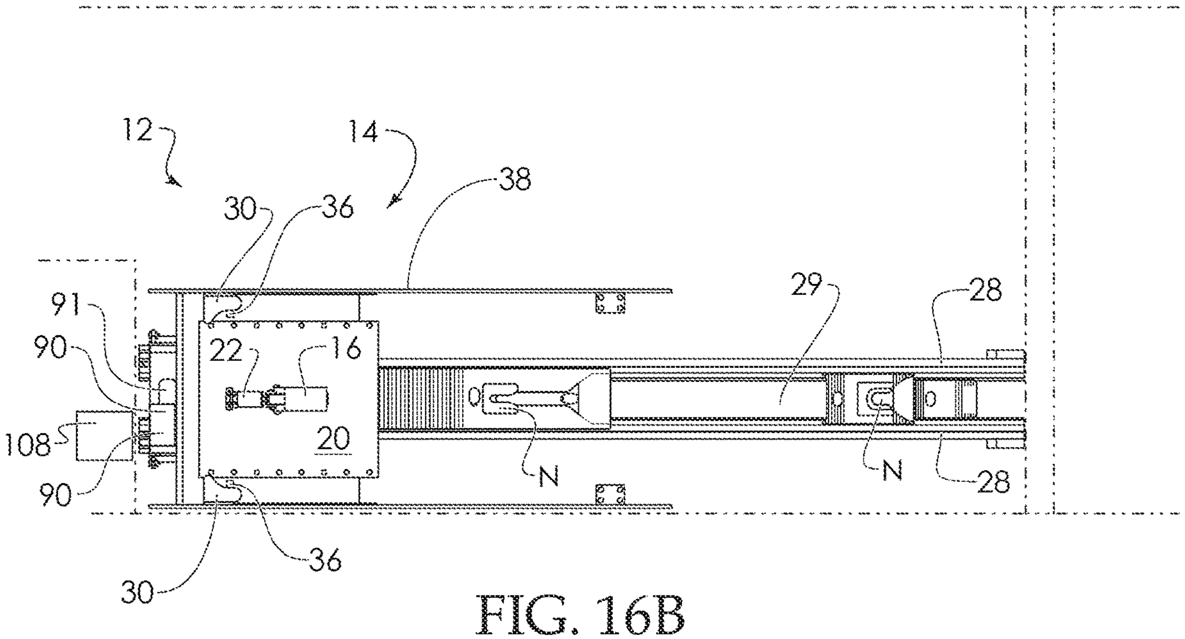
Figure 16C:
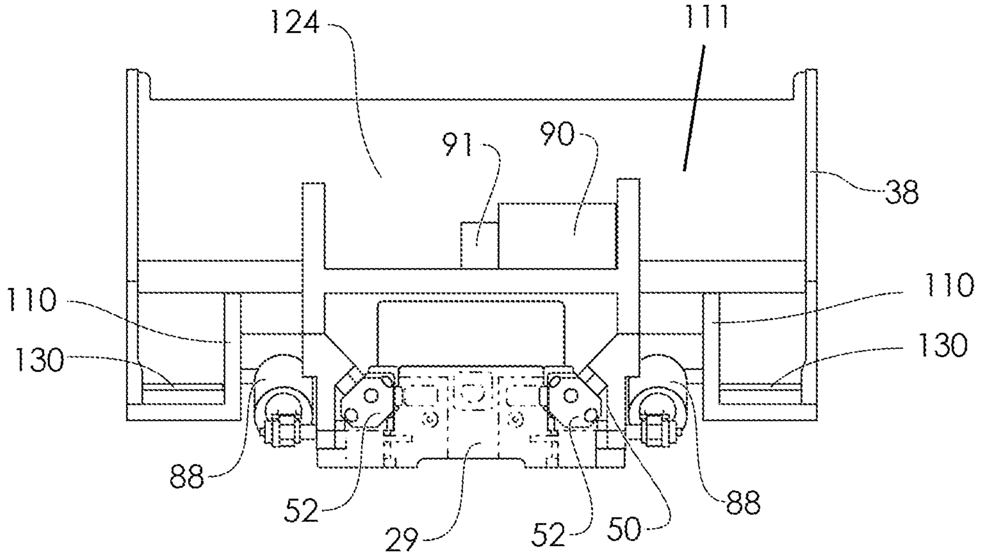

FIGS. 16A-16C show the placement of parts for an alternative deployable gurney lift assembly 12 in which the carriage assembly 14 is manually advanced back and forth along the rails. FIG. 16A is a view from the back of the ambulance A showing the wheel bearings 52 engaged in the rails 28. FIG. 16B shows the universal floor mount 29 which has only two rails 28 and no track 27. As shown in FIG. 16C, this embodiment does not have the motor 92, the gear shaft 93, and the gear 44 on the carriage assembly 14.

Figure 17:
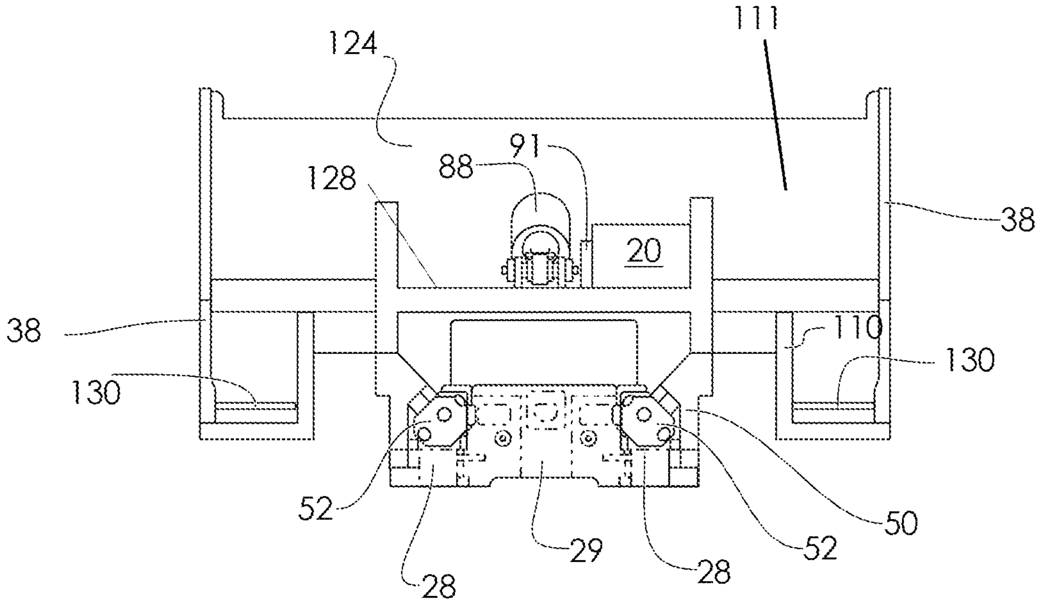
FIG. 17 shows yet another economical alternative embodiment of the present invention in which a single lift cylinder 88 is used to move the carriage arms 38.

In contrast, FIG. 17 shows yet another economical alternative embodiment of the present invention in which a single lift cylinder 88 is used to move the carriage arms 38. In this embodiment, the cylinder 88 is attached at one end to the floor 128 of the motor box, and at the other end to the carriage hinge plate 111. The carriage hinge plate 111 pivot about the carriage hinge plate pivot 126, shown in FIG. 10A, to provide movement of the carriage arms 38 up and down. The embodiment shown in FIG. 17 uses manual deployment along the rails, but it can be seen from FIG. 17 that the motor 92 and gear shaft 93 would be deployed adjacent the hydraulic cylinder 88.

It is to be understood that the present invention is not limited to the embodiments described above but encompasses any and all embodiments within the scope of the following claims.

What is claimed is:

1. A carriage assembly (14) for a deployable gurney lift assembly (12) to lift a gurney (G) using a deployment assembly (29) having at least one deployment rail (28) extending from front to rear ends, in which the gurney (G) has sides and an undercarriage including wheels, a safety bar (B) and an apparatus for raising and lowering the gurney (G), the carriage assembly (14) comprising:

a carriage assembly plate (20) with a top side (100), an underside (102), and two opposing edges (104);

two pivot carriage arms (38) disposed opposite one another on opposing edges (104) of the carriage assembly plate (20) to engage the sides of the gurney (G); and at least one safety bar holder (16) to accommodate the safety bar (B) of the gurney (G);

at least one of the at least one safety bar holders (16) having at least one safety bar latch (18) to receive and secure the safety bar (B) therebetween;

at least one lift actuator (88) for lifting and lowering the pivot carriage arms (38);

wherein, the at least one lift actuator (88) is electric, pneumatic, or hydraulic;

at least one retraction bearing bracket (50) on an underside (102) of a motor box (128), disposed adjacent the carriage assembly plate (20), to engage the at least one deployment rail (28) for slidably moving the carriage assembly (14) along the length thereof to deploy or stow the carriage assembly (14); and a carriage hinge plate (111) disposed to facilitate changing an angle of the carriage assembly plate (20) and the two pivot carriage arms (38) relative to the at least one retraction bearing bracket (50) to facilitate lifting and lowering of the two pivot carriage arms (38) while each of the at least one retraction bearing bracket (50) remains in contact with the at least one deployment rail (28).

2. The carriage assembly (14) of claim 1, wherein:

the at least one retraction bearing bracket (50) has corresponding first and second retraction bearing brackets (50) slidably engaged along the length of the deployment assembly (29), which deployment assembly (29) has a pair of opposing first and second deployment rails (28); and the at least one retraction bearing bracket (50) extends from the underside (102) of the motor box (128);

each of the at least one retraction bearing bracket (50) having a wheel bearing (52) extending therefrom to engage one of the opposing first and second deployment rails (28) to support movement of the carriage assembly (14) along the opposing first and second deployment rails (28).

3. The carriage assembly (14) of claim 1, wherein:

the at least one lift actuator (88) is taken from the group consisting of a telescoping ram, hydraulic jack, or vertical lifting column; or the at least one lift actuator (88) comprises two lift apparatuses (88) fixed on the carriage assembly (14) to lift and lower each pivot carriage arm (38); or each of the at least one lift actuator (88) comprises one hydraulic jack (88) which is supplied by a lifting hydraulic supply unit (90) with a corresponding pump (91) to lower and lift each pivot carriage arm (38); or combinations thereof.

4. The carriage assembly (14) of claim 1, wherein:

each pivot carriage arm (38) has an idler frame bracket (30), a rotating pickup (32) to engage the undercarriage of the gurney (G), and a locking bracket pin (36) to secure the gurney (G) in place on each pivot carriage arm (38); and the locking bracket pin (36) being disposed under the idler frame bracket (30) to further restrict movement of the gurney (G) engaged on the carriage assembly (14).

5. The carriage assembly (14) of claim 4, wherein:

the rotating pickup (32) has a pick up body (39) rotatably held in place on the each pivot carriage arm (38) by a carriage pickup pin shaft (33) mated with a mating pickup shaft (35), and a retention pin (41);

the carriage pickup pin shaft (33) having a keyway cot (45), and the mating pickup shaft (35) has an internal keyway that fits the keyway (47) of carriage pickup pin shaft (33), and a spring (37) to keep tension between the carriage pickup pin shaft (33) and the mating pickup shaft (35), and the retention pin (41) provides secure attachment between the pick up body (39) of the rotating pickup (32) and each pivot carriage arm (38).

6. The carriage assembly (14) of claim 1, further comprising:

a hydraulic jack (22) affixed to the carriage assembly plate (20); wherein the hydraulic jack (22) has an actuation arm (26) affixed to the at least one safety bar holder (16) and the at least one safety bar latch (18) to bias the at least one safety bar latch (18) from an open position to a closed position.

7. The carriage assembly (14) of claim 1, further comprising:

a drive motor (92) disposed on the motor box (128);

a shaft (93) extending from the drive motor (92) and having a drive gear (44) disposed on the shaft opposite the drive motor (92); and the drive gear (44) extending beneath the underside (102) of the carriage assembly plate (20) to engage in track (27) disposed adjacent to, or upon, the at least one rail (28) of the deployment assembly (29).

8. The carriage assembly (14) of claim 1, wherein:

the at least one safety bar holder (16) and the at least one latch (18) are pivotably connected by a pivot point pin (120) which permits the at least one latch (18), or both at least one safety bar holder (16) and at least one latch, to be biased together to secure a gurney (G) therebetween;

the at least one safety bar holder (16) and at least one latch (18) are actuated by a hydraulic jack (22) which has a piston (26) retractably extending from the hydraulic jack (22) in which the piston (26) is clevis mounted (114) to the at least one latch (18) with a quick release pin (118);

the hydraulic jack (22) is pivotably attached by a pivot pin (116) to a safety bar jack bracket (112) affixed to the carriage assembly plate (20); wherein the at least one latch (18) may extend through the carriage assembly plate (20) beneath the at least one safety bar holder (16) when the at least one latch (18) is in an open or unsecured position.

9. The carriage assembly (14) of claim 1, further comprising:

a pair of carriage angles (110) disposed between the pivot carriage arms (38) and the carriage assembly plate (20) to connect each of the pivot carriage arms (38) to the adjacent edge (104) of the carriage assembly plate (20); wherein each of the at least one lift actuator (88) is a hydraulic jack (88) affixed to one of the pair of carriage angles (110) at a swivel pin (136), and to one of the at least one retraction bearing bracket (50) to control the angle of the pivot carriage arms (38) and to deploy and stow the carriage assembly (14), and to lift a gurney (G) engaged in the at least one safety bar holder (16) and the at least one safety bar latch (18).

10. The carriage assembly (14) of claim 1, wherein:

each of the at least one lift actuator (88) is a hydraulic jack (88) affixed to a motor box base (128), and to the carriage hinge plate (111), to lift and lower the carriage assembly plate (20) with each of the pivot carriage arms (38) attached thereto.

11. A deployable gurney lift assembly (12) for lifting a gurney (G) with sides and an undercarriage including wheels, a safety bar (B), and an apparatus for raising and lowering the gurney (G) that is installed to be deployable on at least one deployment rail (28) extending from front to rear ends, the deployable gurney lift assembly (12) comprising:

a carriage assembly (14); and a deployment assembly (29) having the at least one deployment rail (28) for slidably moving the carriage assembly (14) along the length thereof; wherein the carriage assembly (14) comprises a carriage assembly plate (20) with a top side (100), an underside (102), and two opposing edges (104);

two pivot carriage arms (38) disposed opposite one another on opposing edges (104) of the carriage assembly plate (20) to engage the sides of the gurney (G), and at least one safety bar holder (16) to accommodate a safety bar (B) of the gurney (G);

at least one of the at least one safety bar holder (16) having at least one safety bar latch (18) to receive and secure the gurney safety bar (B) therebetween;

at least one lift actuator (88) for lifting and lowering the pivot carriage arms (38);

wherein, the lift actuator (88) is electric, pneumatic, or hydraulic;

at least one retraction bearing bracket (50) on an underside (102) of a motor box (128) to engage the at least one deployment rail (28) for slidably moving the carriage assembly (14) along the length thereof to deploy or stow the carriage assembly (14); and a carriage hinge plate (111) disposed to facilitate changing an angle of the carriage assembly plate (20) and the pivot carriage arms (38) relative to each of the at least one retraction bearing bracket (50) to facilitate lifting and lowering of the pivot carriage arms (38) while each of the at least one retraction bearing bracket (50) remains in contact with a corresponding rail (28) of the at least one deployment rail.

12. The deployable gurney lift assembly (12) of claim 11, wherein:

the front and rear ends of the at least one deployment rail terminate at stops to secure the carriage assembly from advancing off the rail.

13. The deployable gurney lift assembly (12) of claim 11, wherein:

the at least one deployment rail (28) comprises opposing first and second deployment rails (28) extending parallel from front ends to rear ends; and the at least one retraction bearing bracket (50) has corresponding first and second retraction bearing brackets (50) slidably engaged along the length of the first and second deployment rails (28);

the at least one retraction bearing bracket (50) extends from the underside (102) of the motor box (128);

each of the at least one retraction bearing bracket (50) having a wheel bearing (52) extending therefrom to engage the at least one deployment rail (28) to support movement of the carriage assembly plate (20) along the at least one deployment rail (28).

14. The deployable gurney lift assembly (12) of claim 11, further comprising:

a drive motor (92) with a shaft (93) extending therefrom disposed in the motor box (128) of the carriage assembly (14);

a gear rack (27) with teeth disposed parallel to the at least one deployment rail (28); and a drive gear (44) disposed at an end of the shaft (93); wherein the drive gear (44) engages the teeth on the gear rack (27) such that when the drive motor (92) rotates the drive gear (44) to advance the carriage assembly (14) along the teeth of the gear rack (27) to deploy and stow the carriage assembly (14).

15. The deployable gurney lift assembly (12) of claim 14, wherein:

the gear rack (27) is disposed above the at least one deployment rail (28).

16. The deployable gurney lift assembly (12) of claim 11, wherein:

the at least one retraction bearing bracket (50) has corresponding first and second carriage assembly bearing brackets (50) with bearings (52) slidably engaged in a pair of opposing first and second deployment rails (28) of the at least one deployment rail (28) engaged along the length of the deployment assembly (29);

the at least one bearing bracket (50) extends from the underside (102) of the motor box (128) at the back of the carriage assembly plate (20); and wherein each of the at least one retraction bearing bracket's (50) wheel bearing (52) extends therefrom to engage at least one of the at least one deployment rail (28) to support movement of the carriage assembly (14) along the at least one deployment rail (28).

17. The deployable gurney lift assembly (12) of claim 11, wherein:

the at least one lift actuator (88) is taken from the group consisting of a telescoping ram, hydraulic jack, or vertical lifting column; or the at least one lift actuator (88) comprises two lift apparatuses (88) fixed on the carriage assembly (14) to lift and lower each pivot carriage arm (38); or each of the at least one lift actuator (88) comprises one hydraulic jack (88) which is supplied by a lifting hydraulic supply unit (90) with a corresponding pump (91) to lower and lift each pivot carriage arm (38); or combinations thereof.

18. The deployable gurney lift assembly (12) of claim 11, wherein:

each pivot carriage arm (38) has an idler frame bracket (30), a rotating pickup (32) to engage the undercarriage of the gurney (G), and a locking bracket pin (36) to secure the gurney (G) in place on each pivot carriage arm (14); and the locking bracket pin (36) being disposed under the idler frame bracket (30) to further restrict movement of the gurney (G) engaged on the carriage assembly (14).

19. The deployable gurney lift assembly (12) of claim 18, wherein:

the rotating pickup (32) has a pick up body (39) rotatably held in place on each pivot carriage arm (38) by a carriage pickup pin shaft (33) mated with a mating pickup shaft (35), and a retention pin (41);

the carriage pickup pin shaft (33) having a keyway cot (45), and the mating pickup shaft (35) has an internal keyway that fits the keyway (47) of carriage pick up shaft (35), and a spring (37) to keep tension between the carriage pickup pin shaft (33) and the mating pickup shaft (35), and the retention pin (41) provides secure attachment between the pick up body (39) of the rotating pickup (32) and each pivot carriage arm (38).

20. The deployable gurney lift assembly (12) of claim 11, further comprising:

a hydraulic jack (22) affixed to the carriage assembly plate (20); wherein the hydraulic jack (22) has an actuation arm (26) affixed to the at least one safety bar holder (16) and the at least one safety bar latch (18) to bias the at least one safety bar latch (18) from an open position to a closed position.

21. The deployable gurney lift assembly (12) of claim 11, further comprising:

a drive motor (92) disposed on the motor box (128) of the carriage assembly plate (20);

a shaft (93) extending from the drive motor (92) and having a drive gear (44) disposed on the shaft opposite the drive motor (92); and the drive gear (44) extending beneath the underside (102) of the carriage assembly plate (12) to engage in a track (27) disposed adjacent to, or upon, the at least one deployment rail (28) of the deployment assembly (29).

22. The deployable gurney lift assembly (12) of claim 11, wherein:

the at least one safety bar holder (16) and the at least one safety bar latch (18) are pivotably connected by a pivot point pin (120) which permits the at least one safety bar latch (18), or both at least one safety bar holder (16) and at least one safety bar latch, to be biased together to secure a gurney (G) therebetween;

the at least one safety bar holder (16) and the at least one safety bar latch (18) are actuated by a hydraulic jack (22) which has a piston (26) retractably extending from the hydraulic jack (22) in which the piston (26) is clevis mounted (114) to the at least one safety bar latch (18) with a quick release pin (118);

the hydraulic jack (22) is pivotably attached by a pivot pin (116) to a safety bar jack bracket (112) affixed to the carriage assembly plate (20); wherein the at least one safety bar latch (18) may extend through the carriage assembly plate (20) beneath the at least one safety bar holder (16) when the at least one safety bar latch (18) is in an open or unsecured position.

23. The deployable gurney lift assembly (12) of claim 11, further comprising:

a pair of carriage angles (110) disposed between the carriage arms (38) and the carriage assembly plate (20) to attach each pivot carriage arms (38) to the adjacent edge (104) of the carriage assembly plate (20); wherein each of the at least one lift actuator (88) is a hydraulic jack (88) affixed to one of the carriage angles (110) at the swivel pin (136), and to one of the at least one retraction bearing bracket (50) to control the angle of the pivot carriage arms (38) and to deploy and stow the carriage assembly (14), and to lift a gurney (G) engaged in the at least one safety bar holder (16) and the at least one safety bar latch (18).

24. The deployable gurney lift assembly (12) of claim 11, wherein:

at least one hydraulic jack (88) is affixed to the base (124) of the motor box (128), and to the carriage hinge plate (111), to lift and lower the carriage assembly plate (20) with each of the pivot carriage arms (38) attached thereto.

* * * * *